United States Patent [19]
Bridge, Jr.

[11] 3,823,441

[45] July 16, 1974

[54] MEAT TENDERIZER

[76] Inventor: Edward W. Bridge, Jr., c/o Bridge Machine Co., Inc. Kennedy St., Palmyra, N.J. 08065

[22] Filed: May 18, 1973

[21] Appl. No.: 361,547

[52] U.S. Cl. ............................................. 17/26
[51] Int. Cl. ..................................... A22c 9/00
[58] Field of Search ........................ 17/25, 26, 27, 28

[56] References Cited
UNITED STATES PATENTS
2,263,855 11/1941 Spang .................................... 17/25
2,583,199 1/1952 Bakewell................................ 17/26

Primary Examiner—Robert Peshock
Attorney, Agent, or Firm—Zachary T. Wobensmith, 2nd; Zachary T. Wobensmith, III

[57] ABSTRACT

Meat tenderizer apparatus is provided in which a flat piece of meat to be tenderized is fed between a set of cutter rollers, rotated in flat condition through a predetermined angle, passed between a second set of cutter rollers, rotated in flat condition through a predetermined angle, passed between a third set of cutter rollers and delivered for use with each set of cutter rollers cutting or breaking the meat fibers and being adjustable to accomodate different thicknesses of cutlets.

12 Claims, 6 Drawing Figures

MEAT TENDERIZER

BACKGROUND OF THE INVENTION

1. Field of the Invention

This invention relates to meat tenderizer apparatus of the kind wherein a cutlet of meat is tenderized by passing it between a series of cutter rollers which cut or break the meat fibers and which provides for horizontal rotation of the meat in flat condition between the second and third sets of cutter rollers.

2. Description of the Prior Art

The tenderizing of meat to make tough pieces more edible has occupied considerable time and effort in designing machines to accomplish such tenderizing in a short time period.

The usual tenderizing of tough meat cutlets is accomplished in a machine which has a pair of cutter rollers provided with teeth for breaking or cutting the fibers of the meat, with the path of movement of the meat generally being downwardly, but in some instances horizontally.

To tenderize the meat cutlet the cutlet is fed between the cutter rollers, it is then picked up by hand after discharge from the rollers and turned ninety degrees, and sent between the rollers again. If desired, the meat may be sent through the rollers for a third time. This operation is quite slow and uneconomical and requires an undue amount of manual manipulation by the operator.

Machines of this general type are illustrated in the U.S. Pat. to S. S. Stein et al., U.S. Pat. No. 3,222,713; W. Swift, U.S. Pat. No. 1,982,487; J. P. Spang, U.S. Pat. No. 2,279,071; and F. H. Vogelsang, U.S. Pat. No. 3,716,893.

The apparatus of my invention has none of the disadvantages and many advantages over the prior apparatus for meat tenderizing, particularly in the reduction of manual operations.

SUMMARY OF THE INVENTION

A meat tenderizer apparatus is provided wherein a cutlet of meat has its fibers broken between successive sets of adjustable cutter rollers with rotation of the meat cutlet in flat condition prior to passing between the additional sets of cutter rollers.

The principal object of the invention is to provide meat tenderizer apparatus which is fast and positive in its operation.

A further object of the invention is to provide meat tenderizer apparatus where the degree of turning of the meat cutlet between the sets of rollers can be varied.

A further object of the invention is to provide meat tenderizer apparatus wherein the distance between the cutter rollers can be varied to provide for different thicknesses of meat cutlets.

Other objects and advantageous features of the invention will be apparent from the description and claims.

DESCRIPTION OF THE DRAWINGS

The nature and characteristic features of the invention will be more readily understood from the following description taken in conjunction with the accompanying drawings forming part hereof in which.

Figure 1:
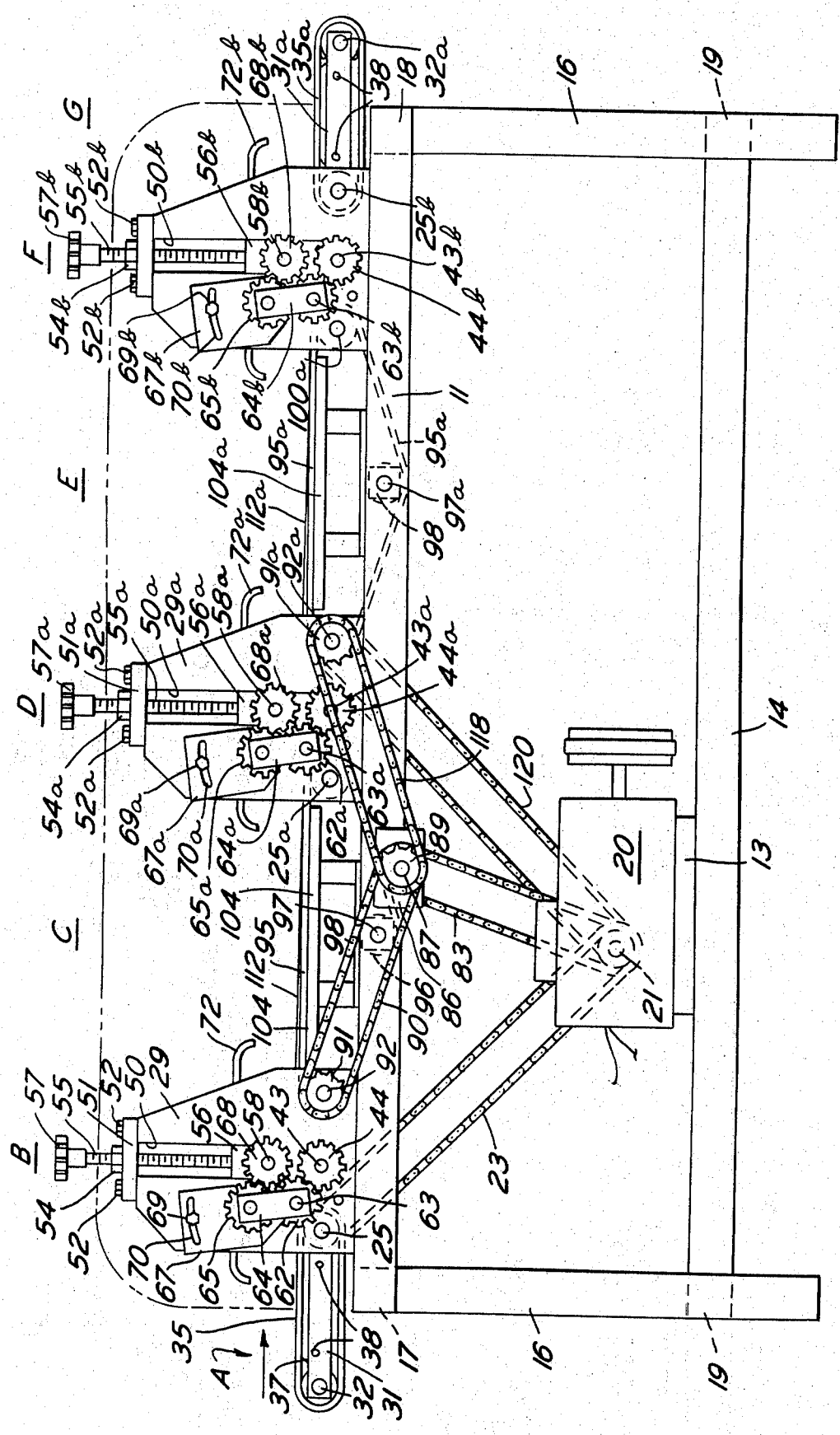
FIG. 1 is a side elevational view of one embodiment of the meat tenderizer apparatus of my invention.
Figure 2:
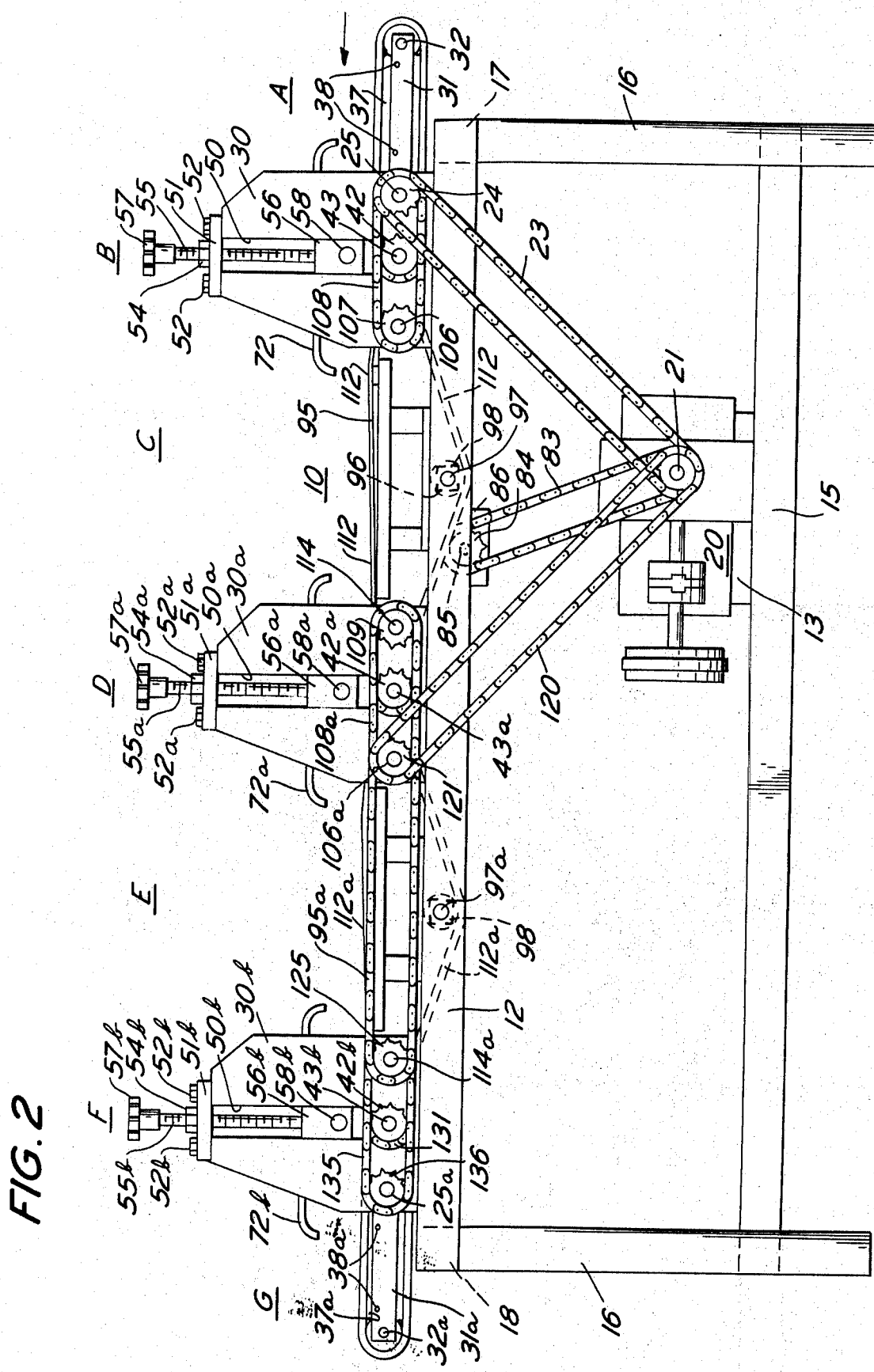
FIG. 2 is a side elevational view of the apparatus of FIG. 1 but illustrating the apparatus from the opposite side.
Figure 3:
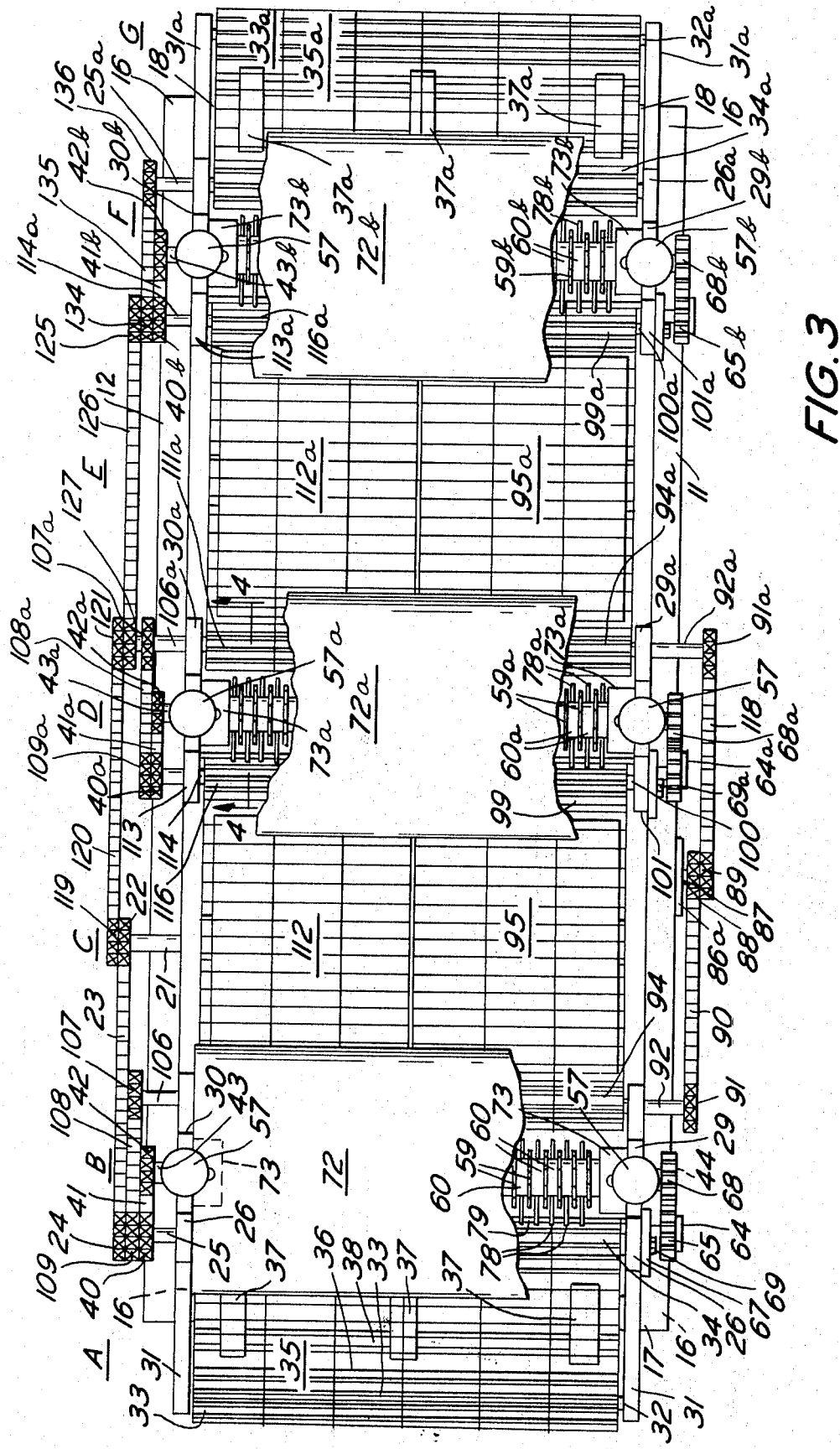
FIG. 3 is a top plan view of the meat tenderizer apparatus shown in FIGS. 1 and 2.
Figure 4:
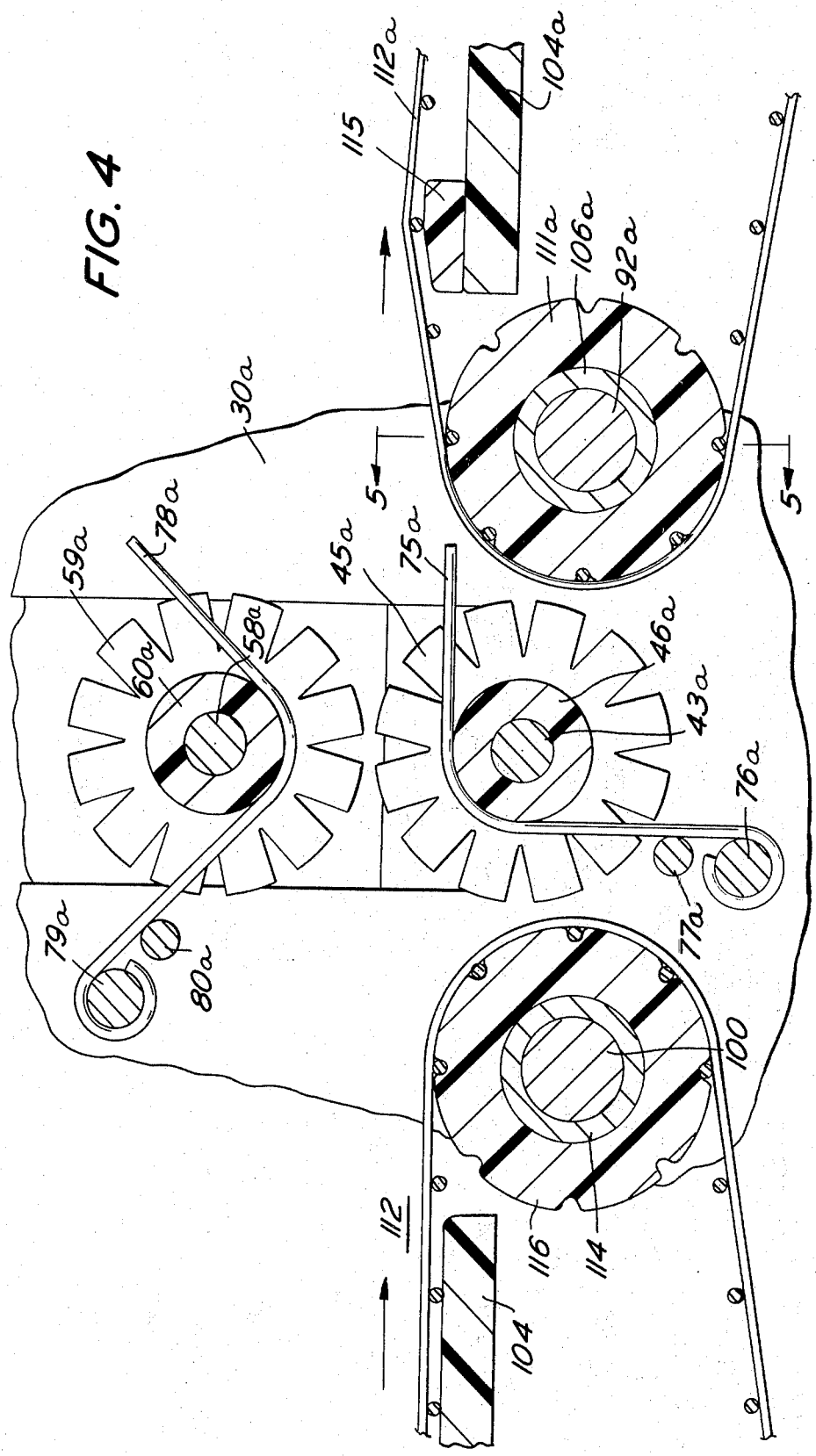
FIG. 4 is a vertical sectional view, enlarged, taken approximately on the line 4—4 of FIG. 3.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings and FIGS. 1 to 5 thereof, the meat tenderizer apparatus of the invention preferably includes, in succession, a feeder section A, a first cutter roller section B, a first meat shifting or change positioning section C, a second cutter roller section D, a second meat shifting or change positioning section E, a third cutter roller section F and a delivery section G.

The machine to be described includes a bed or frame 10 with horizontal top side rails 11 and 12, horizontal bottom side rails 14 and 15, and vertical legs 16 attached to the top and bottom side rails 11 and 12. Upper horizontal end rails 17 and 18 connect the legs 16 and lower end rails 19 connect the legs 16 and bottom side rails 14 and 15.

A driving motor 20 is mounted between the bottom side rails 14 and 15 on a plate 13 transversely spanning the side rails 14 and 15.

The motor 20 has an output shaft 21 with a sprocket gear 22 thereon and a chain 23 and the sprocket gear 22 is engaged with a sprocket gear 24 on a shaft 25.

The shaft 25 is journaled in bearings 26 carried in upright frame plates 29 and 30 mounted respectively on the top side rails 11 and 12. Extensions 31 attached to the frame plates 29 and 30 have a shaft 32 therebetween on which transversely grooved spaced idler rollers 33 are mounted.

The shaft 25, between the side rails 11 and 12, has a plurality of transversely grooved spaced driving rollers 34 secured thereto for movement therewith.

The grooved driving rollers 34 and idler rollers 33 have an endless belt 35 carried thereon to effect a feeding function from the section A to the section B.

The belt 35 can be of any desired type capable of sterilization but preferably is of well known link construction with a plurality of transverse wire elements 36 connected to provide flexibility, endwise and transversely.

The belt 35 is preferably supported between its side margins by a plurality of supporting arms 37 carried on supporting rods 38 between the extensions 31.

The shaft 25 has a sprocket gear 40 keyed thereto with a chain 41 in engagement therewith and driving a sprocket gear 42 on a shaft 43. The shaft 43 extends to the opposite side of the machine and is journaled in the extends through the frame plate 29 and has a gear 44 keyed thereto.

The shaft 43 carries a plurality of separated knife-like cutter blades 45 formed on discs and which extend radially outwardly from the shaft 43 providing a lower meat fiber cutting or crushing cutter roller. These blades 45 and their interposed spacers 46 are similar to the cutter blades 45a and and their spacers 46a shown in FIG. 4 and hereinafter referred to.

The frame plates 29 and 30 each has a central slot 50 which is closed at the top by plate 51 secured thereon by cap screws 52.

Nuts 54, carried on the plates 51, have adjusting screws 55 engaged therewith and shaft journal blocks 56 vertically slidably carried and movable by rotating the knobs 57 on the screws 55. The blocks 56 rotatably carry a transverse shaft 58 which has a plurality of separated knife like cutter blades 59 formed on discs and which extend radially outwardly from the shaft 58 providing upper meat fiber cutting or crushing rollers. These cutter blades 59 and their interposed spacers 60 are similar to the cutter blades 59a and their spacers 60a shown in FIG. 4 and hereinafter referred to.

The shaft 43 has the gear 44 thereon engaged with a gear 62 rotatably carried by a shaft 63 journaled in frame plate 29 and mounted on plate 64 which gear 62 is engaged with a gear 65 carried on a stub shaft 66 also mounted on plate 64. A shiftable retaining plate 67 pivoted on the shaft 63 positions the gears 62 and 64 for engagement with gear 68 on shaft 58. The plates 64 and 67 can be swung to select positions and held by the bolt 69 engaged in slot 70 for driving the shaft 58 for different adjusted positions vertically of the cutter blades 59 in accordance with the setting of the knobs 57.

A transparent guard plate 72 carried on brackets 73 secured to the blocks 56 prevents injury to the operator.

The lower cutter blades 45 are preferably provided with interposed stripper fingers 75 carried on transverse mounting bars 76 and held by retainer bars 77, both carried by the frame plates 29 and 30 and upper cutter blades 59 are preferably provided with interposed stripper fingers 78 carried on transverse mounting bars 79 and held by retainer bars 80, both carried by the frame plates 29 and 30. The stripper fingers 75 and 78 and their associated structure are similar to the corresponding structure shown on FIG. 4 and hereinafter referred to.

The stripper fingers 75 and 78 are effective for separating the meat from the cutter rollers as the meat leaves section B and enters section C.

The shaft 21 has a sprocket gear (not shown) connected by a chain 83 to a sprocket gear 84 on a shaft 85. The shaft 85 is the input shaft to a reducing gear box 86 which is mounted to side rail 12 and has an output shaft 87 with two sprocket gears 88 and 89 thereon. The gear 88 has a chain 90 engaged therewith and with a sprocket gear 91 carried by shaft 92 which is journaled in side rail 11.

The shaft 92 extends transversely across the bed or frame 10, is similar in construction to the shaft illustrated in FIG. 5 and hereinafter referred to. The shaft 92, at one side of the center thereof, has a plurality of transversely notched belt driving rollers 94 secured thereto carrying an endless belt 95, similar to the belt 37 but only of a width of approximately one half of the distance between the side rails 11 and 12.

The belt 95 is engaged intermediate its ends and below its top run by idler rollers 96 on a shaft 97 which is journaled in bearings 98 on side rails 11 and 12. The belt 95 is also carried at its other end on transversely notched rollers 99 rotatably mounted to shaft 100 which is journaled in bearings 101 and is supported at its other end in a telescoping shaft 114 similar to that shown in FIG. 5.

The belt 95, intermediate its ends, can be supported by a supporting plate 104 carried by the side rails 11 and 12.

Figure 5:
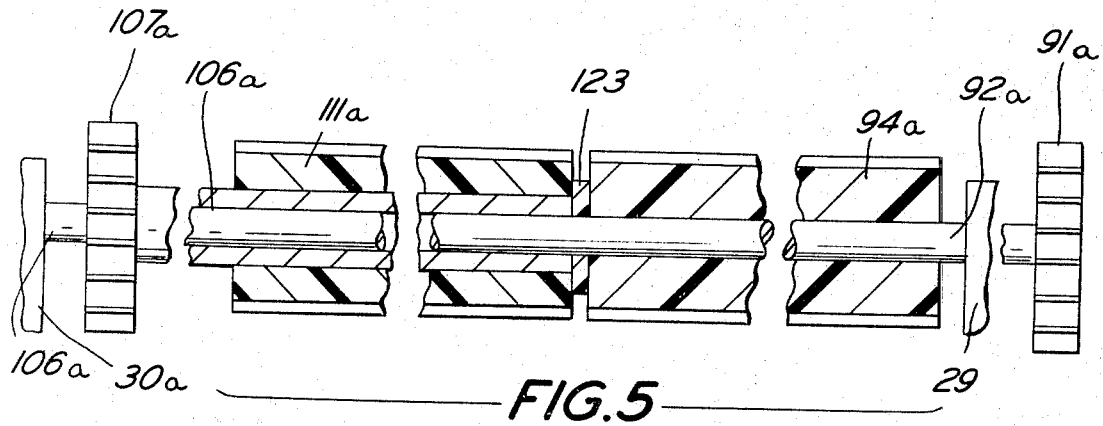
FIG. 5 is a vertical sectional view of reduced size taken approximately on the line 5—5 of FIG. 4.

The shaft 92, at the other side of the center, is telescoped within a shaft 106, similar to that shown in FIG. 5.

The shaft 106 has a sprocket gear 107 secured thereto which is engaged by a chain 108 which is carried on a sprocket gear 109 secured to and driven by shaft 25.

The shaft 106 extends transversely across the bed or frame 10 a distance of approximately one half of the distance between the side rails 11 and 12 and has a plurality of notched belt driving rollers 111 secured thereto and carrying an endless belt 112 similar to the belts 37 and 95. The belt 112 can be at the same height as the belt 95 along which it moves but it is preferred, as illustrated in more detail in FIG. 4, to interpose a wedge 115 on the supporting plate 104 to elevate one edge of the belt 112 slightly. This construction has been found to improve the meat turning action.

The belt 112, at its exit end, is carried on transversely grooved rollers 116 secured to a telescoped shaft 114, journaled in a bearing 113 in frame plate 30a.

The belts 95 and 112 are preferably driven at different linear speeds so that the meat delivered thereto in section C from the cutter rollers of section B will be turned in flat condition through the desired angle before entering the cutter rollers of section D and as to provide a different orientation of the meat for tenderizing.

The structure of section D is similar to that of section B with upright frame plates 29a and 30a with a shaft 43a carrying cutter blades 41a and spacers 46a similar to the shaft 43, blades 45a and spacers 46a and with a shaft 58a similar to the shaft 58 and carrying cutter blades 59a and spacers 60a similar to the cutter blades 59 and spacers 60 and with other structure identified by similar reference numerals. The upper cutter blades 59a are adjustable, in the same manner as before, by manipulation of the knobs 57a, the shaft 43a being driven by gears 44a, 62a, 65a and 58a with an adjustable retaining plate 67a and associated structure like that of section B.

The shaft 92a has a sprocket gear 91a thereon which has a chain 118 in driving engagement therewith, the chain 118 being in engagement with the sprocket gear 89 driven by the shaft 87.

The shaft 21 has a sprocket gear 119 secured thereto engaged by a chain 120 which is engaged with a sprocket gear 121 on the shaft 106a. The shaft 106a has a sprocket gear 107a thereon with which a chain 108a is in engagement. The chain 108a is in driving engagement with a sprocket gear 109a on the shaft 114 which drives the rollers 116. The shaft 43a, through gears 62a, 65a and 68a drives the shaft 58a in a manner similar to that previously described for the shaft 58.

Figure 6:
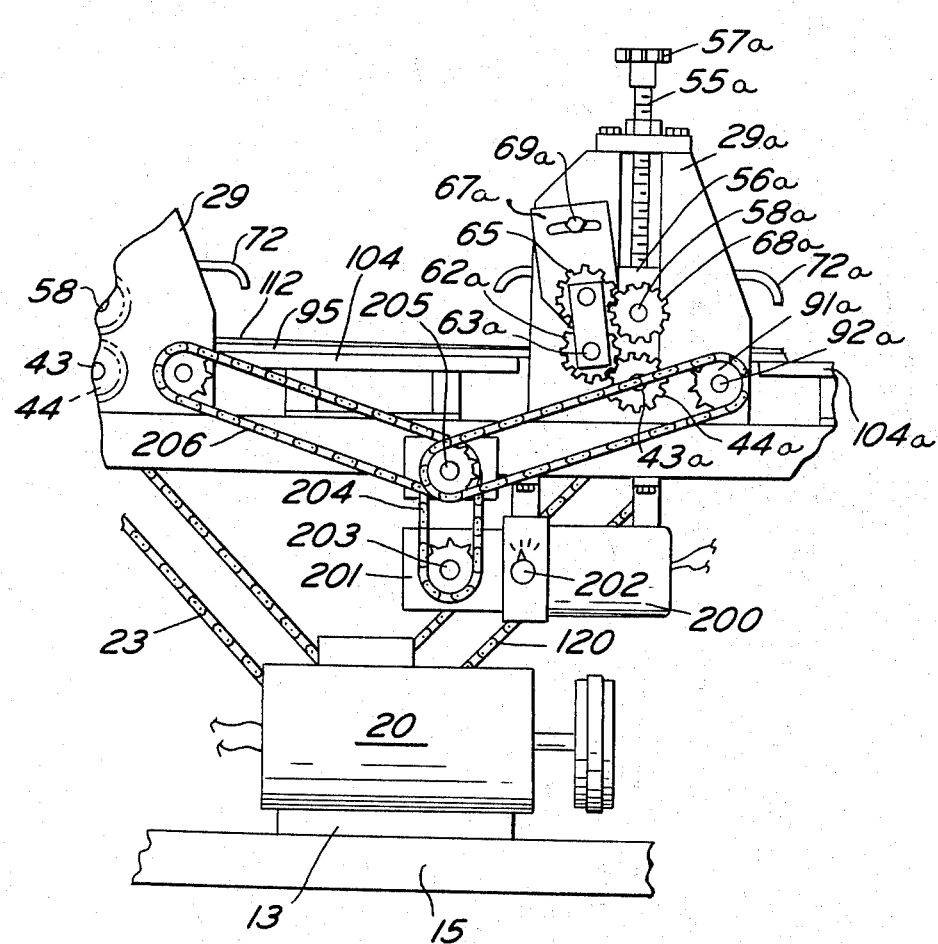
FIG. 6 is a fragmentary view in elevation of a portion of the apparatus illustrated in FIG. 1 but showing another embodiment of driving mechanism.

The section E is similar to section C, previously described, with belts 95a and 112a, driven respectively by transversely grooved rollers 94a and 111a on shafts 92a and 106a, with a supporting plate 104a therebelow. The relationship between roller cutters 45a and 49a, the belts 112 feeding the roller cutters and the succeeding belt 112a, as well as the telescoping shafts 114 and 116 and 92a and 106a is shown in FIGS. 5 and 6, with a thrust washer or spacer 123 to separate the chain carrying rollers.

The roller 99a is carried on a shaft 100a journaled in a bearing 101a which is telescoped in a shaft 114a journaled in a bearing 113a.

The shaft 114a is driven by a sprocket gear 125 by a sprocket gear 125 with which a chain 126 is in engagement, the chain 126 being driven by a sprocket gear 127 on the shaft 106a.

The structure of section F is similar to that of sections B and D with upright frame plates 29b and 30b, with a shaft 43b carrying cutter blades 45b and spacers 46b, similar to the shafts 45 and 43a, blades 45b and spacers 46b and with a shaft 58b similar to the shafts 58 and 58a and carrying cutter blades 59b and spacers 60b similar to the cutter blades 59 and 59a and spacers 60 and 60a.

The position of the upper cutter blades 59b is adjustable in the same manner as before by manipulation of the knobs 57b, the shaft 43b being driven by gears 44b, 62b, 65b and 68b with an adjustable retaining plate 67b and associated structure like that of sections B and D.

The shaft 114a has a sprocket gear 40b secured thereto which is engaged by a chain 41b on a sprocket gear 42b driving the shaft 43b and by which the cutter blade 45b and 59b are driven.

The shaft 114a also has a sprocket gear 134 secured thereto with which a chain 135 is in engagement. The chain 135 is in driving engagement with a sprocket 136 on a shaft 25a journaled in bearings 26a carried in upright frame plates 29b and 30b mounted on the top side rails 11 and 12. Extensions 31a attached to the frame plates 29a and 30a have a shaft 32a therebetween on which transversely grooved spaced idler rollers 33a are mounted.

The shaft 25a between the side rails 11 and 12, has a plurality of transversely grooved spaced driving rollers 34a secured thereto for movement therewith.

The grooved driving rollers 34a and idler rollers 34a have an endless belt 35a thereon as part of the delivery section G The mode of operation will now be pointed out.

Referring to the embodiment shown in FIGS. 1 to 5, the motor 20 is activated and shaft 21, through chain 23 and shaft 25 is effective to drive the belt 35 of the delivery section A for delivery of flat pieces of meat or cutlets between the spaced cutter blades 45 and 59 of the cutter rollers of the first cutter roller section B. The action of the cutter blades 45 and 59 is to cut and break the meat fibers from both sides of the piece. The upper cutter blades 59 can be moved upwardly or downwardly by movement of the knobs 57, the gear drive for the upper shaft 58 being adjustable for continuity of drive at any adjusted position.

The meat from the cutter blades of the section B is stripped from the blades by the stripper fingers 75 and 78 as required and moves onto the belts 95 and 112 of section C.

The belts 95 and 112, by reason of their different linear speeds, cause each flat piece of meat to turn in flat condition in the desired extent during its progress through section C. The angular extent of turning is determined for the predetermined distance of linear travel, by the differential between the speeds of the blets 95 and 112. The flat piece of meat can be turned through an angle of 90° although a lesser or greater turning can be imparted, if desired.

Each piece of meat from section C then moves between the cutter blades 45a and 59a of section D where it is again subjected to a fiber cutting and/or breaking action. The piece of meat is then stripped, if necessary, by the stripper fingers 75a or 78a, as before, and moves onto the belts 95a and 112a of section E.

The flat piece of meat, as it advances in section E, is turned in a similar manner to that previously described, the angular extent of turning in flat condition being determined by the differential of the linear speeds of the belts 95a and 112a.

The piece of meat thus turned then moves between the cutter blades 45b and 59b of section F where it is again subjected to a fiber cutting and/or breaking action. The piece of meat is then stripped, if necessary, by the stripper fingers 75 b or 78b, as before, and moves onto the delivery belt 35a for delivery for packaging.

In the embodiment of FIG. 6, in order to provide greater flexibility, and to vary over a predetermined range, the linear speed of the belts 95, 95a with respect to the belts 112, 112a, a second electric driving motor 200 and a speed reducer 201 are provided, having a speed varying controller 202.

The motor 200 is connected by chains 20 and 120, and other driving mechanism previously described, for driving the shafts 25, 43, 41, 106, 106a, 114, 43a, 41a, 114a, 43b, and 25a.

The output shaft 203 has a chain 204 carried thereon, engaged with a sprocket gear (not shown) on a shaft 205 journaled on the side rail 11.

The shaft 205, through a sprocket gear (not shown) and chain 206, drives the sprocket gear 91 on the shaft 92 and through a sprocket gear (not shown) and chain 207 drives the sprocket gear 91a on shaft 92a. By varying the setting of the controller 202, the relative linear speeds of the belts 95, 95a, and 112, 112a can be adjusted to change the meat turning action.

It will thus be seen that apparatus has been provided with which the objects of the invention are attained.

I claim:

1. Apparatus for tenderizing pieces of meat comprising
   a first pair of spaced cutter rollers each having a plurality of blades for engagement with opposite faces of a piece of meat,
   means for receiving a piece of meat from said first pair of cutter rollers and for turning said piece of meat in flat condition through a predetermined angle,
   a second pair of spaced cutter rollers each having a plurality of blades for engagement with opposite faces of the piece of meat, and
   driving means for said pairs of cutter rollers and said means for receiving and turning.

2. Apparatus as defined in claim 1 in which
   at least one of said pairs of cutter rollers has members for adjusting the spacing between said rollers.

3. Apparatus as defined in claim 2 in which driving members are provided for said rollers for continuity of driving of said rollers at different adjustments of said spacing of said rollers.

4. Apparatus as defined in claim 1 in which
said means for receiving and turning said piece of meat comprises
a plurality of belts, and
said driving means includes members for driving said belts at different linear speeds.

5. Apparatus as defined in claim 4 in which
one of said belts has a portion thereof elevated to facilitate turning of a piece of meat on said belts.

6. Apparatus as defined in claim 4 in which
separate driving means is provided for one of said belts,
said separate driving means including a belt speed control member.

7. Apparatus as defined in claim 4 in which
said belts are mounted on telescoping shafts for differential movements.

8. Apparatus as defined in claim 1 in which
a second means is provided receiving a piece of meat from said second pair of spaced cutter rollers and for turning said piece of meat through a predetermined angle,
a third pair of spaced cutter rollers is provided each having a plurality of blades for engagement with opposite faces of a piece of meat from said second means.

9. Apparatus as defined in claim 8 in which
said driving means is connected in driving relation to said second means and to said third pair of cutter rollers.

10. Apparatus as defined in claim 9 in which
said spaced cutter rollers, and said receiving means are mounted for substantially horizontal advancing movement of a piece of meat.

11. Apparatus as defined in claim 1 in which
feeding means for a piece of meat is provided in advance of said pair of spaced rollers.

12. Apparatus as defined in claim 1 in which
said pairs of cutter rollers and said means for receiving and for turning a piece of meat are mounted for substantially horizontal advancing movement of a piece of meat.

* * * * *